Sept. 2, 1969  E. J. FALK  3,464,741

CONTROL VALVE

Filed Feb. 12, 1968

INVENTOR
EDWARD J. FALK
BY
*Joseph E. Papin*

United States Patent Office 3,464,741
Patented Sept. 2, 1969

3,464,741
CONTROL VALVE
Edward J. Falk, St. Louis, Mo., assignor to Wagner Electric Corporation, Newark, N.J., a corporation of Delaware
Filed Feb. 12, 1968, Ser. No. 704,732
Int. Cl. B60t 13/12
U.S. Cl. 303—6                                    23 Claims

ABSTRACT OF THE DISCLOSURE

A control valve including a proportioning portion for effecting a metered application through said control valve of fluid pressure supplied thereto, a control portion movable from a normally centered position toward opposed translated positions in response to a predetermined differential between said supplied fluid pressure and another fluid pressure separately supplied to said control valve, and by-pass passage means for the first named supplied fluid pressure and subjected thereto upon movement of said control portion to one of its opposed translated positions to obviate the metering function of said proportioning means.

---

Figure 4:
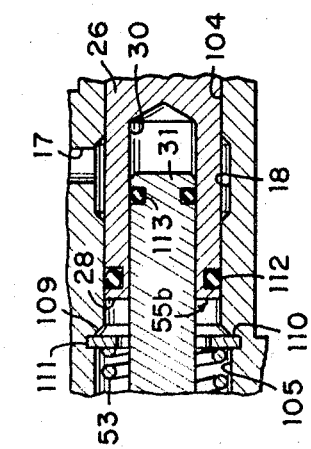

This invention relates to dual fluid pressure systems in general and in particular to control valves for controlling pressure fluid flow through one of said systems.

In the past, dual fluid pressure systems were provided with a driver warning or control valve having switch actuating means shiftable between opposed translated positions in response to fluid pressure failure in one of said dual systems to energize a driver warning or dash lamp and also having a proportioning valve for proportioning the fluid pressure in one of the dual systems delivered to one of the vehicle brake sets. One of the disadvantageous or undesirable features of such past constructions was that the driver warning valves and proportioning valves were separate units which not only adversely affected the cost of manufacturing but also the cost of assembly, both of the valves per se and on the vehicle, and the utilization of such separate valve units also prevented a space factor problem since the under-the-hood space in modern vehicles is becoming critical. Another of the disadvantageous or undesirable features of such past constructions was that the proportioning valve continued to meter or proportion the fluid pressure applied to the one vehicle brake set even though a failure had occurred in the portion of the dual system connected with the other vehicle brake set. Still another of the disadvantageous or undesirable features of such past constructions was that the proportioning valve continued to meter or proportion the fluid pressure applied to the one vehicle brake set when the magnitude thereof was predeterminately less than that of the fluid pressure in the portion of the dual system connected with the other vehicle brake set wherein the predetermined differential therebetween was effective to actuate the driver warning valve. And still another disadvantageous feature of such past constructions was that the fluid pressure applied to the one vehicle brake set was not by-passed around the proportioning valve to obviate the metering function thereof and utilize the unaltered or unmetered magnitude thereof to energize the one vehicle brake set under emergency conditions effected upon the failure of the fluid pressure in the other portion of said dual system connected with said other vehicle brake set.

The primary object of the present invention is to provide a control valve which overcomes the aforementioned disadvantageous or undesirable features, and this, as well as other objects and advantageous features of the present invention, will bcome apparent hereinafter.

Briefly, the present invention comprises a control valve having a housing subjected to separately supplied fluid pressures, means for effecting a metered application through said housing of one of the supplied fluid pressures, other means movable in said housing toward opposed translated positions in response to a predetermined differential between the separately supplied fluid pressures and defining with said housing passage means for subjection to the one supplied fluid pressure to by-pass said first named means and obviate the metering function thereof when the one supplied fluid pressure exceeds the other of the supplied fluid pressures by the predetermined value to effect movement of said other means toward one of its opposed translated positions.

Figure 3:
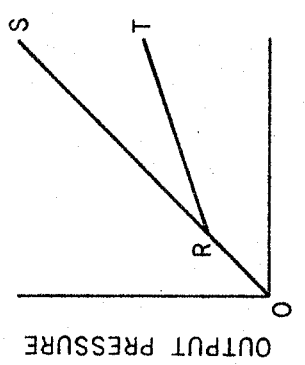
Figure 2:
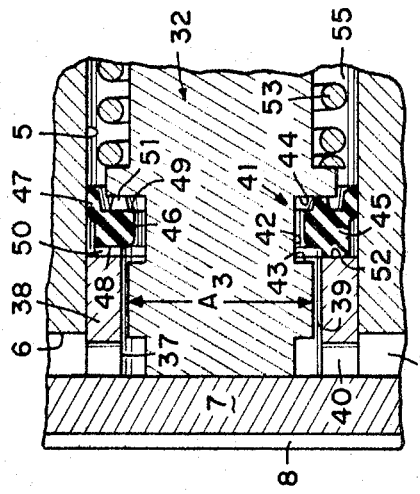
Figure 1:
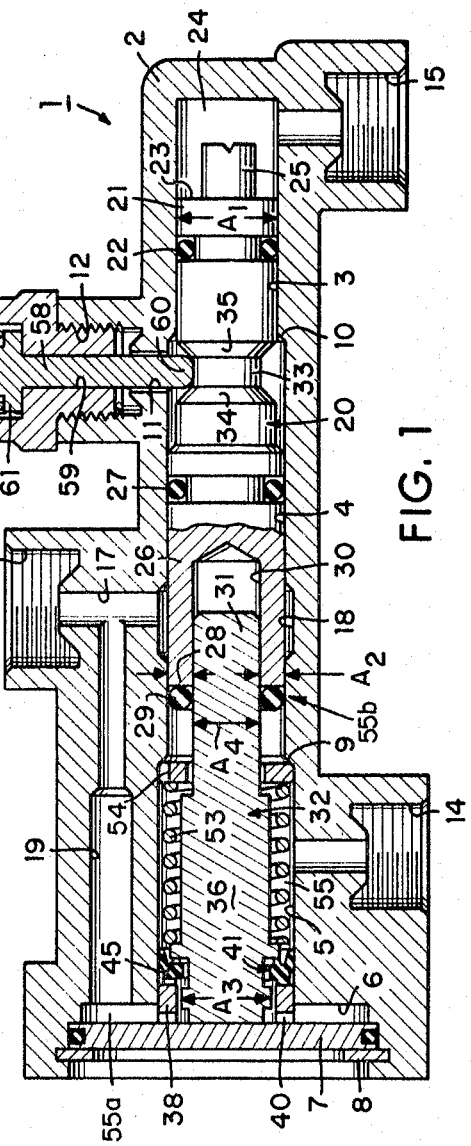

In the drawings wherein like numerals refer to like parts wherever they occur:

FIG. 1 is a sectional view showing a control valve embodying the present invention in cross-section, FIG. 2 is an enlarged fragmentary view taken from FIG. 1, FIG. 3 is a graphical representation illustrating the output fluid pressure effected by the control valve of FIG. 1 in response to the input pressure supplied thereto, and FIG. 4 is a fragmentary view of the control valve of FIG. 1 showing an alternative construction in cross-section also embodying the present invention.

A control valve 1 is provided with a housing 2 having a blind bore 3 therein, and the leftward end of said housing bore is coaxially aligned with stepped counterbores 4, 5. An annular recess or counterbore 6 is provided in the leftward end of the housing 2 connecting with the counterbore 5, and a closure member 7 is retained in said recess against displacement by a snap ring and groove assembly 8. Annular shoulders 9, 10 are respectively provided on the housing 2 at the juncture of the stepped counterbores 4, 5 and at the juncture of the counterbore 4 with the bore 3, and a cross-bore 11 has one end intersecting said counterbore 4 adjacent to the housing shoulder 10 and the other end thereof connecting with a cross-counterbore 12 adapted to receive an electrical switch, indicated generally at 13, to be discussed hereinafter. Inlet ports 14, 15, adapted for connection with a dual or split system master cylinder (not shown) of a type well known in the art, are provided in the housing 2 respectively intersecting the counterbore 5 adjacent to the housing shoulder 9 and the bore 3 adjacent to the rightward end thereof, and an outlet port 16 is also provided in said housing for connection with one of the vehicle front and rear brake sets (not shown). A passage 17 has one end connecting with the outlet port 16 and the other end thereof connecting with an annular groove or undercut 18 provided in the counterbore 4 adjacent to the midportion thereof, and another passage 19 is interposed between the passage 17 and the housing recess 6.

A switch actuating member or piston, indicated generally at 20, is shown in its normal operating or centered position having a rightward portion 21 slidable in the housing bore 3 and carrying a peripheral seal 22 therein for sealing engagement with said housing bore, and said switch piston rightward portion is provided with a free end 23 defining with said housing bore an inlet chamber 24 in pressure fluid communication with the inlet port 15. An extension 25 is integrally provided on the switch piston free end 23 for abutting engagement with the end wall of the housing bore 3 to define the rightward translated position of the switch piston 20, as will be discussed hereinafter. The switch piston 20 is also provided with an enlarged leftward portion 26 slidable in the housing counterbore 4, and a peripheral seal 27 is provided in said switch piston in sealing engagement with said counterbore between the cross-bore 11 and groove 18. The switch piston leftward portion 26 extends coaxially through the groove 18 in the counterbore 4, and the leftward or free end 28 thereof defines a seat for another sealing for valve member, such as the O-ring type seal 29, which is normally sealably engaged between said switch piston leftward free end and said counterbore. A blind bore 30 is provided through the leftward end 28 of the switch piston 20 to slidably receive a reduced or stem portion 31 of a metering member or proportioning piston 32 which also extends through the seal 29 in sealing engagement therewith, and the end wall of said switch piston bore 30 is normally spaced from the free end of said proportioning piston stem 31 and adapted for abutting engagement therewith to define the leftward translated position of said switch piston, as will be discussed hereinafter. A peripheral groove 33 is provided in the switch piston 20 between the seals 22, 27 and normally positioned beneath the housing cross-bore 11 when said switch piston is in its centered position, and the opposed side walls 34, 35 of said groove respectively define opposed cam surfaces at predetermined angles with the axis of said switch piston. It should be noted that an effective area $A_1$ is provided on the switch piston free end 23 responsive to fluid pressure at the inlet port 15, and another effective area $A_2$, which is substantially equal and opposed to the area $A_1$, is defined by the seal 26 and the switch piston free end 28 responsive to fluid pressure at the inlet port 14.

Referring now to FIGS. 1 and 2, the proportioning piston 30 is provided with an enlarged or head portion 36 integrally formed with the stem 31 and loosely guided in a bore 37 of a sleeve or spacer member 38 which is received in the housing counterbore 5 and extends through the housing recess 6 into abutment with the closure member 7. An annular passage 39 is provided between the proportioning piston head 36 and the guide member bore 37, and a plurality of radially extending slots 40 are provided in the guide member 38 interconnecting the passage 39 and housing recess 6. A peripheral groove 41 is provided in the proportioning piston head 36 having a base portion 42 interposed between opposed side walls 43, 44, and an annular seal or valve element 45 is received in said groove. The seal 45 is provided with an annular base portion 46 radially spaced from the groove base 42, an annular outer lip 47 in sealing engagement with the housing counterbore 5, and opposed sides 48, 49 interconnecting said base and lip and opposed to the groove side walls 43, 44, respectively. A plurality of annularly spaced abutments 50, 51 are respectively provided on the opposed sides 48, 49 of the seal 45 for abutting engagement with the inner or rightward end 52 of the sleeve 38 and the groove side wall 44. A proportioning or metering spring 53 is pre-compressed between the proportioning piston head 36 and a retainer or abutment member 54 urging said retainer into abutting engagement with the housing shoulder 9 and normally urging said proportioning piston head into abutting engagement with the closure member 7.

When the proportioning piston head 36 is biased into engagement with the closure member 7, as shown, the proportioning piston is in its non-metering position,, and the groove side wall 43 which defines an annular valve seat is spaced from engagement with its cooperating side or face 48 of the seal 45. The seating engagement of the groove side wall 43 with the seal face 48 defines an effective area $A_3$ on the proportioning piston head 36, and the proportioning piston stem 31 is provided with another effective area $A_4$ less than the area $A_3$; therefore, it is obvious that the area $A_3$ is responsive to fluid pressure at the outlet port 16 and the difference between areas $A_3$, $A_4$, i.e., $A_3-A_4$, is responsive to fluid pressure at the inlet port 14. Another inlet chamber 55 is provided in the housing 2 between the peripheral portions of the proportioning piston stem and head 31, 36 and the counterbores 4, 5 and between the seals 26, 45 in open pressure fluid communication with the inlet port 14, and an outlet chamber 55a is generally defined leftwardly of the seal 45 in the sleeve bore 37 and housing recess 6 in open pressure fluid communication with the outlet port 16. It should also be noted that the counterbores 4, 5, the groove 18 in the counterbore 4, and the passage 17 define a by-pass passage, indicated generally at 55b, which is connected in shunt or by-pass relation around the proportioning piston 32 between the inlet and outlet ports 14, 16, and said by-pass passage is normally closed by the sealing engagement of the seal 26 with the housing counterbore 4, the proportioning piston stem 31 and the leftward free end 28 of the switch piston 20, as shown.

The electrical switch 13 is provided with a conductive closure or plug member 56 threadedly received in the housing cross-counterbore 12, and a metal terminal 57 extends through said plug member and is insulated therefrom, said terminal having an exterior end for connection with an electrical circuit of a type well known to the art for selectively energizing a driver warning or dash lamp (not shown). A conductive switch member 58 is slidably received in a bore 59 provided in the switch closure member and in electrical contact or conductive engagement therewith, said switch member having a follower portion or end 60 extending through the housing cross-bore 11 into following engagement with the peripheral groove 33 of the switch piston 20 in the housing bore 3 and having an upper end portion 61 defining a contact for electrical contact or conductive engagement with the interior end of the terminal 57. A spring 62 of predetermined compressive force urges the contact 61 away from the interior end of the terminal 57 and urges the switch member follower end 60 into positioning engagement with the switch piston peripheral groove 33. It should be noted that the compressive force of the spring 62 is predetermined at a value great enough to substantially maintain the switch piston 20 in its centered position and prevent shifting or translatory movement thereof when taken in conjunction with the force of the switch member follower end 60 being moved up the inclined peripheral side walls 34, 35 of said groove which also opposes such translatory movement of said switch piston.

In the operation with the component parts of the control valve 1 positioned as shown in the drawings and as described hereinabove, independent or separately supplied input fluid pressures $P_1$, $P_2$ normally having substantially equal magnitudes are supplied upon actuation of the split master cylinder (not shown) to the inlet ports 14, 15, respectively, of the control valve 1. The input fluid pressure $P_2$ flows from the inlet port 15 into the inlet chamber 24 acting on the switch piston area $A_1$ to establish a force $P_2A_1$, and the input fluid pressure $P_1$ flows from the inlet port 14 into the inlet chamber 55 acting on the switch piston area $A_2$ to establish a force $P_1A_2$ which is substantially equal and opposite to the force $P_2A_1$; therefore, the switch piston 20 is relatively unaffected by the input fluid pressures $P_1$, $P_2$ acting thereacross and will remain substantially in its centered position. The input fluid pressure $P_1$ is applied from the inlet chamber 55 through the passage defined between the proportioning piston groove 41 and the valve element 45, the passage 39 into the outlet chamber 55a and therefrom through the passages 19, 17 to the outlet port 16 to establish an applied or output fluid pressure $Po$. The input fluid pressure $P_1$ acts on the input effective area $A_3-A_4$ of the proportioning piston 32 to establish an input force $P_1 (A_3-A_4)$, and the output fluid pressure $Po$ acts on the output effective area $A_3$ of said proportioning piston to establish an output force $PoA_3$ opposed to the input force $P_1 (A_3-A_4)$. Since the input and output fluid pressures $P_1$, $Po$ are initially equal and since the area $A_3$ is greater than the area $A_3-A_4$ of the metering piston, it is obvious that the output force $PoA_3$ is greater than the input force $P_1 (A_3-A_4)$; however, the compressive force $Fc$ of the metering spring 53 is additive to the input force $P_1 (A_3-A_4)$ and thereby movement of the proportioning piston 32 is prevented until the input and output fluid pressures $P_1$,$Po$ exceeds a predetermined value, as shown by the line OR in the graphical representation of FIG. 3. When the predetermined value R of the input and output fluid pressures $P_1$, $Po$ is attained, the output force $PoA_3$ overcomes the additive input and spring forces $P_1$ $(A_3-A_4)$, $Fc$ to move the proportioning piston 32 from its inoperative or disabled position in a rightward direction toward an operative or metering position against the compressive force $Fc$ of the metering spring 53 to store the energy thereof. This rightward movement of the proportioning piston 32 initially engages the valve seat 43 thereof with the leftward face 48 of the valve element 45 to isolate the input fluid pressure $P_1$ from the output fluid pressure $Po$ and disengages the leftward end of said proportioning piston from the closure member 7.

From the graphical representation in FIG. 2, it is obvious that the increases in the magnitude of the input fluid pressure $P_1$ in excess of the predetermined value R, as illustrated by the line RS in FIG. 3, will result in proportionally reduced increases in the output fluid pressure $Po$, as illustrated by the line RT. For instance, when the input fluid pressure $P_1$ is increased to a value in excess of the predetermined value R, the input force $P_1$ $(A_3-A_4)$ is correspondingly increased and additive to the spring force $Fc$ to overcome the output force $PoA_3$; therefore, the proportioning piston 32 is moved leftwardly to disengage the proportioning piston seat 43 from the valve element face 48 to effect a metered application of the increased input fluid pressure $P_1$ through the passage defined between the proportioning piston groove 41 and the valve element 45 and the passage 39 into the outlet chamber 55a and therefrom through the passages 19, 17 to the outlet port 16 to effect a proportional or ratioed increase in the output fluid pressure $Po$, as shown by the lint RT in the graph of FIG. 3, wherein $$Po = \frac{P_1(A_3-A_4) + Fc}{A_3}$$

Of course, the increased output fluid pressure $Po$ in excess of the predetermined value R effects a corresponding increase in the output force $PoA_3$, and when the increased output force $PoA_3$ attains an increased value greater than that of the increased input force $P_1(A_3-A_4)$ and the additive spring force $Fc$, the proportioning piston 32 is again moved rightwardly to reposition the valve seat 43 thereof in lapped engagement with the valve element face 48 and again isolate the increased input and output fluid pressures $P_1$, $Po$. It is, of course, obvious that the proportioning piston will be responsive to further increases in the input fluid pressure $P_1$ to effect further proportional increases in the output fluid pressure $Po$ in the same manner as previously described, and it should also be noted that as the input fluid pressure $P_1$ is increased, the separate input fluid pressure $P_2$ is also substantially equally increased to maintain the opposing forces $P_2A_1$ and $P_1A_2$ acting across the switch piston 20 substantially equal to obviate displacement or translatory movement thereof from its centered position.

When the split system master cylinder is de-actuated, the input fluid pressures $P_1$, $P_2$ are vented to atmosphere which eliminates the forces $P_2A_1$ and $P_1A_2$ acting on the switch piston 20, as well as the input force $P_1$ $(A_4-A_3)$ acting on the proportioning piston. Upon the elimination of the input fluid pressure $P_1$, the output fluid pressure $Po$ acting on the valve element 45 displaces the lip 47 thereof from sealing engagement with the housing counterbore 5, and in this manner, the applied or output fluid pressure $Po$ returns from the outlet port 16 through passages 17, 19, the outlet chamber 55a, the passage 39 and therefrom through the passage defined between the rightward end 52 of the sleeve 38 and the valve element face 48 and past the displaced sealing lip 47 of the valve element 45 to the inlet chamber 55 and the inlet port 14. When the output fluid pressure $Po$ is so reduced to correspondingly reduce the output force $PoA_3$ to a value less than that of the metering spring force $Fc$, the metering spring 53 moves the proportioning piston 32 leftwardly toward its original position in abutting engagement with the closure member 7 displacing the proportioning piston valve seat 43 from the valve element face 48 and thereby opening the passage defined between the valve element 45 and the proportioning piston groove 41 to again establish pressure fluid communication between the inlet and outlet chambers 55, 54 and effect complete elimination of the output fluid pressure $Po$.

In the event of the failure of the input fluid pressure $P_2$ due to a malfunction of the split master cylinder or other leaks or the like, it is, of course, desirable to obviate the metering function of the proportioning piston 32 and effect the application of an unaltered or unmetered output fluid pressure to the output port 16 in order to utilize the maximum available fluid pressure for energizing the vehicle brake set connected with said outlet port under such emergency conditions; therefore, when the magnitude of the input fluid pressure $P_1$ exceeds that of the failed input fluid pressure $P_2$ by a predetermined value, the force $P_1A_2$ acting on the switch piston 20 will displace said switch piston rightwardly in the housing bore 3 and counterbore 4 toward its rightward displaced or translated position engaging the switch piston extension 25 with the end wall of said housing bore since the force $P_2A_1$ normally opposing such translatory movement is eliminated upon the failure of the input fluid pressure $P_2$. This rightward translatory movement of the switch piston 20 moves the leftward end 28 thereof toward a position disengaged from the housing counterbore 4 and into coaxially spaced relation with the undercut 18 of said housing counterbore when said switch piston is in its rightward translated position, and of course, the seal 26 is also movable with said switch piston rightward end into said undercut and disengaged from said housing counterbore to open the by-pass passage 55b between the inlet and outlet ports 14, 16. In this manner, the input fluid pressure $P_1$ flows from the inlet port 14 through the inlet chamber 55, the by-pass passage 56 and the housing passage 17 to the outlet port 16 in by-pass relation with the proportioning piston 32 to obviate metering actuation thereof, and it is, of course, obvious that the input and output fluid pressures $P_1$, $Po$ are equal when said by-pass passage is opened to effect the application of the maximum available fluid pressure to the vehicle brake set connected with said outlet port under the emergency conditions. Further, the rightward translatory movement of the switch piston 20 also moves the cam surface thereof rightwardly toward a position driving the switch member 58 reciprocally thereon against the compressive force of the switch spring 62 to engage the contact 61 with the interior end of the terminal 57 and, in this manner, complete the electrical circuit for energizing the driver warning or dash lamp (not shown).

The control valve 1 functions in substantially the same manner to complete the electrical circuit for energizing the driver warning dash lamp in the event of the alternative failure of the supplied fluid pressure $P_1$ wherein the force of the supplied fluid pressure $P_2$ acting on the switch piston area $A_1$ effects the leftward translatory movement of the switch piston 20 to engage the end wall of the switch piston blind bore 30 with the free end of the proportioning piston stem 31 which defines the leftward translated position of said switch piston when the proportioning piston 32 is engaged with the closure member 7. During the leftward translatory movement of the switch piston, the cam surface 35 thereof drivingly engages the switch member 58 to actuate the switch 13, as previously described.

Referring now to FIG. 4, an alternative construction for the control valve 1 is shown wherein the housing 2 is provided with stepped counterbores 104, 105 which define an annular housing shoulder 109 therebetween and adjacent to the undercut 18 in the housing counterbore 105. Another undercut 110 is provided in the counterbore 105 adjacent to the shoulder 109 to receive an internal snap ring or abutment 111, and the rightward end of the metering spring 53 is biased into engagement with said snap ring. A seal 112 is provided in the peripheral surface of the proportioning piston stem 31 adjacent to the free end thereof for sealing engagement with the switch piston bore 30, and another seal 113 is provided in the peripheral surface of the switch piston 20 adjacent to the leftward end 28 thereof for sealing engagement with the housing counterbore 104 between the undercut 18 thereof and the housing shoulder 109 when said switch piston is in its centered position. The seal 113 is moved into the undercut 18 of the housing counterbore 104 and disengaged from said housing counterbore to open the by-pass passage 55b upon the translatory movement of the switch piston 20 into its rightward translated position, and the leftward end 28 of said switch piston is moved into engagement with the snap ring 111 which defines the leftward translated position of said switch piston upon the leftward translatory movement thereof.

From the foregoing, it is now apparent that a novel control valve 1 meeting the objects set out hereinbefore, as well as other objects and advantageous features, is provided and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, means for comparing the magnitudes of separate fluid pressures supplied to said housing and movable therein from a normally centered position toward opposed translated positions in response to oppositely directed differentials in excess of a predetermined amount between the magnitudes of the supplied fluid pressure respectively acting thereon, metering means defining with said housing and said first named means a flow passage through said housing for one of the supplied fluid pressures and movable in said housing to control the application through said flow passage of the one supplied fluid pressure, said metering means being initially movable in response to the one supplied and applied fluid pressures of a predetermined value toward a position in said flow passage isolating the one supplied and applied fluid pressures and being thereafter further movable in response to increases in the one supplied fluid pressure in excess of the predetermined value toward a metering position in said flow passage to effect a metered increase in the applied fluid pressure in a predetermined ratio with the increased one supplied fluid pressure in excess of the predetermined value, and other means within said housing including said first named means defining passage means for subjection to the one supplied fluid pressure and connected by by-pass relation with said flow passage around said metering means, said passage means being subjected to the one supplied fluid pressure to by-pass said metering means and obviate metering actuation thereof upon movement of said first named means toward one of its opposed translated positions when the magnitude of the one supplied fluid pressure exceeds that of the other of the supplied fluid pressures respectively acting on said first named means by the predetermined amount.

2. The control valve according to claim 1, wherein said first named means comprises piston means slidable in said housing and having opposed end portions, a pair of substantially equal and opposed areas on said end portions respectively subjected to the supplied fluid pressures, said piston means being movable toward its one and other translated positions in response to the oppositely directed differentials between magnitudes of the one and other supplied fluid pressures in excess of the predetermined amount respectively acting on said opposed areas, and one of said opposed end portions normally closing said passage means when said piston means is in its centered position and being movable toward a position opening said passage means to establish the by-pass flow therethrough of the one supplied fluid pressure when said piston means is moved to its one translated position.

3. The control valve according to claim 2, wherein said one opposed end portion is normally engaged with said housing to close said passage means, and recess means in said housing adjacent to said one end portion when said piston means is in its centered position, said one opposed end portion being moved into said recess means and out of engagement with said housing to open said passage means when said piston means is moved to its one translated position.

4. The control valve according to claim 1, wherein said metering means includes piston means slidable in said housing, resilient means normally urging said piston means toward engagement with said housing, and a valve element on said piston means and defining therewith a portion of said flow passage, said piston means being movable against the force of said resilient means in response to the one supplied and applied fluid pressures of the predetermined value acting thereon toward a position disengaged from said housing and engaged with said valve element to isolate the one supplied and applied fluid pressures and being thereafter further movable in response to the increased one supplied fluid pressure and assisted by the force of said resilient means to the metering position disengaged from said valve element to effect the metered increase in the applied fluid pressure in the predetermined ratio with the increased one supplied fluid pressure in excess of the predetermined value.

5. The control valve according to claim 4, comprising a valve seat on said piston means normally disengaged from said valve element when the force of said resilient means urges said piston means into engagement with said housing to permit the application through said housing of the one supplied fluid pressure, the initial movement of said piston means moving said valve seat into engagement with said valve element closing said flow passage and isolating the one supplied and applied fluid pressures and the subsequent movement of said piston means toward its metering position disengaging said valve seat from said valve element to effect the metered pressure fluid communication between the one supplied and applied fluid pressures.

6. The control valve according to claim 5, comprising peripheral groove means in said piston means having spaced opposed side walls interconnecting with a base wall, one of said opposed side walls defining said valve seat, said valve element including an annular seal received in said groove means and having a peripheral portion sealably engaged with said housing, an inner portion radially inwardly of said peripheral portion adjacent to said base portion and spaced therefrom, opposed faces interconnecting said peripheral and inner portions, and a plurality of spaced abutment means on said opposed faces and projecting therefrom for respective engagement with said housing and the other of said opposed side walls, the force of said resilient means normally acting on said piston means to engage said other side wall with one of said abutment means and to engage the other of said abutment means with said housing, and an annular sealing surface on one of said opposed faces in circumscribing relation with said flow passage for engagement with said one side wall upon actuation of said piston means.

7. The control valve according to claim 4, comprising a pair of opposed areas on said piston means respectively subjected to the one supplied and applied fluid pressures, one of said opposed areas subjected to the applied fluid pressure being predeterminately larger than the other of said areas subjected to the one supplied fluid pressure to effect the predetermined ratio between said one supplied and applied fluid pressures upon the metering actuation of said piston means.

8. The control valve according to claim 4, wherein said first named means comprises other piston means slidable in said housing and having first and second opposed end portions respectively subjected to the one and other supplied fluid pressures, a bore in said first opposed end portion, and extension means on said first named piston means having a free end portion slidable in said bore.

9. The control valve according to claim 8, wherein said first and second opposed end portions of said other piston means define opposed substantially equal areas respectively subjected to the one and other supplied fluid pressures.

10. The control valve according to claim 8, comprising a bore in said housing axially aligned with a pair of stepped counterbores, a shoulder on said housing between said stepped counterbores, a pair of inlet ports in said housing intersecting said housing bore and one of said counterbores and subjected to the separately supplied fluid pressures, respectively, said second opposed end portion of said other piston means being slidable in said housing bore and subjected to the other supplied fluid pressure at one of said inlet ports, an outlet port in said housing, said passage means including a recess in the smaller of said stepped counterbores in circumscribing relation therewith, a first passage in said housing connecting said outlet port and recess, and a portion of said smaller stepped counterbore between said recess and said shoulder, said first opposed end portion of said other piston means extending coaxially through said recess and being slidable in the portion of said smaller stepped counterbore between said recess and said shoulder to normally close said passage means interrupting pressure fluid communication therethrough between the other of said inlet ports and said outlet port when said other piston means is in its centered position, and opposed substantially equal first and second areas on said first and second opposed end portions subjected to the one supplied fluid pressure at said other inlet port and the other supplied fluid pressure at said one inlet port, said first opposed end portion being moved out of engagement with the portion of said smaller stepped counterbore between said recess and said shoulder and into said recess to open said passage means upon the movement of said other piston means into its one translated position when the magnitude of the one supplied fluid pressure at said other inlet port acting on said first area exceeds that of the other supplied fluid pressure at said one inlet port acting on said second area by the predetermined amount.

11. The control valve according to claim 10, comprising an abutment on said housing adjacent to the end of the larger of said stepped counterbores spaced from said shoulder, sleeve means in said larger stepped counterbore having opposed ends for respective engagement with said abutment and said valve element, another bore in said sleeve means between the opposed ends thereof substantially coaxial with said larger stepped bore, said first named piston means including a head portion, flange means on said head portion guided in said sleeve means bore, a peripheral groove in said head portion having axially spaced side walls interconnected by an annular base wall, said resilient means normally urging said flange means into engagement with said housing abutment, said valve element including an annular seal received in said groove and having an outer peripheral lip portion sealably engaged with said larger stepped counterbore, an inner portion radially inwardly of said peripheral lip portion adjacent to said groove base portion and spaced radially therefrom, opposed faces interconnecting said peripheral lip portion and said inner portion, a plurality of annularly spaced first projections on one of said faces for engagement with one of said groove side walls, and a surface on the other of said faces in circumscribing relation with said flow passage for engagement with the other of said groove side walls, a second passage defined between said seal and groove having one end connected in pressure fluid communication with said other inlet port, a third passage defined between said flange means and sleeve means bore having one end connecting with the other end of said second passage and the other end thereof connected in pressure fluid communication with said outlet port, said second and third passages defining a portion of said flow passage, a third area on said head portion subjected to the applied fluid pressure at said outlet port, and a fourth area on said head portion opposed to and less than said third area subjected to the one supplied fluid pressure at said other inlet port, said piston means being initially movable against said resilient means and relative to said seal in response to the one supplied and applied fluid pressures at said other inlet port and said outlet port respectively acting on said fourth and third areas to engage said other side wall of said groove with said other face of said seal isolating said other inlet port from said outlet port and being thereafter further movable in response to the increases in the one supplied fluid pressure at said other inlet port in excess of the predetermined value acting on said fourth area and assisted by the force of said resilient means to disengage said other side wall from said other face and effect the metered increase in the applied fluid pressure at said outlet port in the predetermined ratio with the increased one supplied fluid pressure at said other inlet port in excess of the predetermined value.

12. A control valve comprising a housing having a pair of fluid pressure input chambers, means movable in said housing between said chambers from a normally centered position toward opposed translated positions in response to oppositely directed differentials in excess of a predetermined amount between the magnitudes of the fluid pressures in said chambers, an output chamber in said housing, metering means movable in said housing between one of said input chambers and said output chamber independently of said first named means and normally establishing pressure fluid communication therebetween, said metering means being movable in response to fluid pressure in said one input chamber and said output chamber of a predetermined value toward a position in said housing interrupting pressure fluid communication between said one input chamber and said output chamber and being thereafter further movable in response to increases in the fluid pressure in said one input chamber in excess of the predetermined value toward another position in said housing effecting a metered increase of the fluid pressure in said output chamber in a predetermined ratio with increases of the fluid pressure in said one input chamber in excess of the predetermined value, and other means within said housing including said first named means defining passage means for subjection to the fluid pressure in said one input chamber upon movement of said first named means toward one of its translated positions and connected between said one input chamber and said output chamber in by-pass relation with said metering means, said passage means being subjected to the fluid pressure in said one input chamber to by-pass said metering means and obviate the metering actuation thereof when said first named means is moved from its centered position to its one translated position in response to the fluid pressure in said one input chamber having a magnitude in excess of that of the fluid pressure in the other of said input chambers by the predetermined amount.

13. A control valve comprising a housing having a pair of inlet ports and an outlet port, means for comparing the magnitudes of the fluid pressures at said inlet ports and movable therebetween from a normally centered position toward opposed translated positions in response to oppositely directed differentials in excess of a predetermined amount between the magnitudes of the fluid pressures at said inlet ports respectively acting thereon, metering means movable in said housing for controlling pressure fluid communication between one of said inlet ports and said outlet port, said metering means being initially movable in response to the fluid pressures at said one inlet port and said outlet port of a predetermined value toward a position in said housing isolating said one inlet port and said outlet port and being thereafter further movable in response to increases in fluid pressure at said one inlet port in excess of the predetermined value toward another position in said housing effecting a metered increase in the fluid pressure at said outlet port in a predetermined ratio with the increased fluid pressure in excess of the predetermined value at said one inlet port, and passage means connected in by-pass relation with said metering means between said one inlet port and said outlet port and normally closed by said first named means in its centered position to interrupt pressure fluid communication therethrough between said one inlet port and said outlet port, said first named means being movable toward one of its opposed translated positions when the magnitude of the fluid pressure at said one inlet port exceeds that at the other of said inlet ports by the predetermined amount to open said passage means establishing pressure fluid communication therethrough between said one inlet port and said outlet port and by-passing said metering means to obviate metering actuation thereof.

14. The control valve according to claim 13, comprising a pair of spaced abutments on said first named means and said metering means, respectively, one of said abutments on said first named means being movable into driving engagement with the other of said abutments to drive said metering means toward a disabled position in said housing establishing open pressure fluid communication between said one inlet port and said outlet port upon the movement of said first named means toward the other of its translated positions when the magnitude of the fluid pressure at the other of said inlet ports exceeds that at said one inlet port respectively acting on said first named means by the predetermined amount.

15. The control valve according to claim 13, wherein said first named means includes a pair of opposed end portions, one of said opposed end portions normally closing said passage means when said first named means is in its centered position and being movable toward a position opening said passage means and establishing the by-pass pressure fluid communication therethrough between said one inlet port and said outlet port upon the movement of said first named means toward its one translated position.

16. The control valve according to claim 15, wherein said passage means includes recess means in said housing adjacent to said one end portion when said first named means is in its centered position, said one end portion being movable into said recess means to open said passage means upon the movement of said first named means toward its one translated position.

17. The control valve according to claim 15, comprising a bore in said first named means extending through said one end portion, said bore having an end wall portion defining abutment means on said first named means, extension means on said metering means movable in said bore, a free end portion on said extension means movable in said bore and defining other abutment means normally spaced from said first named abutment means when said first named means is in its centered position, said first named abutment means being movable into driving engagement with said other abutment means to drive said metering means toward a disabled non-metering position in said housing establishing open pressure fluid communication between said one inlet port and said outlet port upon the movement of said first named means toward the other of its opposed translated positions when the magnitude of the fluid pressure at the other of said inlet ports exceeds that at said one inlet port respectively acting on said first named means by the predetermined amount.

18. The control valve according to claim 15, comprising a pair of opposed substantially equal areas on said end portions subjected to the fluid pressures at said one inlet port and the other of said inlet ports, respectively, said first named means being movable toward its one and other translated positions in response to the oppositely acting differentials between the magnitudes of the fluid pressures at said one and other inlet ports in excess of the predetermined amount respectively acting on said opposed areas.

19. The control valve according to claim 18, comprising extension means on said metering means extending through said one end portion and including a free end portion slidably received in said first named means for driven engagement therewith, said first named means being drivingly engaged with said free end portion upon the movement of said first named means toward its other translated position to concertedly drive said metering means toward a disabled position in said housing establishing open pressure fluid communication between said one inlet port and said outlet port.

20. The control valve according to claim 13, comprising a pair of opposed areas on said metering means respectively subjected to the fluid pressures at said one inlet port and said outlet port, one of said opposed areas subjected to the fluid pressure at said outlet port being predeterminately greater than the other of said areas subjected to the fluid pressure at said one inlet port to effect the predetermined ratio between the fluid pressures at said one inlet port and said outlet port upon the metering actuation of said metering means.

21. The control valve according to claim 13, wherein said metering means includes piston means movable in said housing between said one inlet port and said outlet port, resilient means urging said piston means toward a normal inoperative position in engagement with said housing, and valve means on said piston means and engaged with said housing for controlling pressure fluid communication between said one inlet port and said outlet port, said piston means being movable against the force of said resilient means in response to the fluid pressures at said one inlet port and said outlet port acting thereon toward the isolating position disengaged from said housing and engaged with said valve means to interrupt pressure fluid communication between said one inlet port and said outlet port and said piston means being subsequently further movable in response to increases in the fluid pressure at said one inlet port and assisted by the force of said resilient means toward the metering position disengaged from said valve means to establish metered pressure fluid communication between said one inlet port and said outlet port and effect the metered increase in the fluid pressure at said outlet port in the predetermined ratio with the increased fluid pressure in excess of the predetermined value at said one inlet port.

22. The control valve according to claim 21, comprising a valve seat on said piston means and normally disengaged from said valve means to establish open pressure fluid communication between said one inlet port and said outlet port, said valve seat being movable into engagement with said valve means to interrupt pressure fluid communication between said one inlet port and said outlet port upon the movement of said piston means to the isolating position and said valve seat being disengaged from said valve means to establish metered pressure fluid communication between said one inlet port and said outlet port upon the subsequent movement of said piston means toward the metering position.

23. The control valve according to claim 21, comprising first and second opposed portions on said piston means defining first and second opposed differential areas respectively subjected to the fluid pressures at said one inlet port and said outlet port, said first area subjected to the fluid pressure at said one inlet port being predeterminately less than said second area subjected to the fluid pressure at said outlet port to effect the predetermined ratio between the fluid pressures at said one inlet port and said outlet port upon the metering actuation of said piston means, said first named means including other piston means having third and fourth opposed portions slidable in said housing between said inlet ports, said third portion being engaged with said housing to normally close said passage means when said other piston means is in its centered position, third and fourth areas opposed substantially equal areas on said third and fourth portions respectively subjected to the fluid pressures at said one inlet port and the other of said inlet ports, said third portion being movable toward a position in said housing opening said passage means and establishing pressure fluid communication therethrough between said one inlet port and said outlet port upon movement of said other piston means toward its one translated position when the magnitude of the fluid pressure at said one inlet port acting on said third area exceeds that at said other inlet port acting on said fourth area by the predetermined amount, and extension means on said first named piston means movable through said third portion and having a free end slidable in said other piston means for driven engagement therewith, said other piston means being movable toward the other of its translated positions and into driving engagement with said free end portion to concertedly drive said first named piston means toward its inoperative position establishing open pressure fluid communication between said one inlet port and said outlet port when the fluid pressure at said other inlet port acting on said fourth area exceeds that at said one inlet port acting on said third area by the predetermined amount.

References Cited

UNITED STATES PATENTS

| | | | |
|---|---|---|---|
| 1,993,790 | 3/1935 | Kinsella | 137—101 X |
| 2,195,214 | 3/1940 | Jacob | 303—84 |
| 3,358,097 | 12/1967 | Kersting | 303—84 X |

MILTON BUCHLER, Primary Examiner

J. J. McLAUGHLIN, Jr., Assistant Examiner

U.S. Cl. X.R.

60—54.5; 188—151, 152; 200—82; 303—84; 137—113

UNITED STATES PATENT OFFICE

CERTIFICATE OF CORRECTION

Patent No. 3,464,741          Issued September 2, 1969

Edward J. Falk

It is certified that error appears in the above-identified patent and that said Letters Patent are hereby corrected as shown below:

Column 1, line 43, "vented" should read -- sented --; line 72, "bcome" should read -- become --. Column 3, line 3, "for", second occurrence, should read -- or --. Column 5, line 1, "exceeds" should read -- exceed --; line 35, "lint" should read -- line --. Column 7, line 47, "pasage" should read -- passage --; line 60, "by", first occurrence, should read -- in --.

Signed and sealed this 12th day of May 19 70 .

(SEAL)
Attest:

EDWARD M. FLETCHER, JR.
Attesting Officer

WILLIAM E. SCHUYLER, JR.
Commissioner of Patents